(12) United States Patent
Hashimoto et al.

(10) Patent No.: US 9,254,923 B2
(45) Date of Patent: Feb. 9, 2016

(54) AIRCRAFT FUEL SYSTEM AND AIRCRAFT

(71) Applicant: MITSUBISHI AIRCRAFT CORPORATION, Aichi (JP)

(72) Inventors: Junichiro Hashimoto, Aichi (JP); Ushio Komoda, Aichi (JP)

(73) Assignee: MITSUBISHI AIRCRAFT CORPORATION, Aichi (JP)

( * ) Notice: Subject to any disclaimer, the term of this patent is extended or adjusted under 35 U.S.C. 154(b) by 7 days.

(21) Appl. No.: 14/447,037

(22) Filed: Jul. 30, 2014

(65) Prior Publication Data

US 2015/0034768 A1 Feb. 5, 2015

(30) Foreign Application Priority Data

Aug. 5, 2013 (JP) .................................. 2013-162011

(51) Int. Cl.
| | |
|---|---|
| *B64D 37/02* | (2006.01) |
| *B64D 37/32* | (2006.01) |
| *B64D 37/04* | (2006.01) |
| *B64D 37/06* | (2006.01) |

(52) U.S. Cl.
CPC ................ *B64D 37/32* (2013.01); *B64D 37/04* (2013.01); *B64D 37/06* (2013.01)

(58) Field of Classification Search
USPC ................ 244/135 R, 129.2, 135 C; 55/418; 95/130; 96/4; 137/209
See application file for complete search history.

(56) References Cited

U.S. PATENT DOCUMENTS

| | | | | |
|---|---|---|---|---|
| 3,732,668 | A * | 5/1973 | Nichols ................ | B64D 37/32 |
| | | | | 220/88.3 |
| 4,378,920 | A * | 4/1983 | Runnels ................ | B64D 37/32 |
| | | | | 137/209 |
| 6,547,188 | B2 | 4/2003 | Schmutz et al. | |
| 6,698,692 | B1 * | 3/2004 | Tichenor ............... | B64D 37/24 |
| | | | | 244/135 R |
| 8,074,932 | B2 * | 12/2011 | Surawski ............... | B64D 37/32 |
| | | | | 137/209 |
| 8,114,198 | B2 * | 2/2012 | Isella .................... | B64D 13/06 |
| | | | | 244/135 R |
| 8,147,579 | B2 * | 4/2012 | DeFrancesco ......... | B64D 37/32 |
| | | | | 244/135 R |
| 8,313,061 | B2 * | 11/2012 | Surawski ............... | B64D 37/32 |
| | | | | 244/129.2 |
| 8,828,344 | B2 * | 9/2014 | K-WLam ............... | B64D 37/32 |
| | | | | 422/187 |
| 2003/0116679 | A1 * | 6/2003 | Susko ................... | B64D 37/32 |
| | | | | 244/135 R |
| 2014/0130894 | A1 * | 5/2014 | Fukuda .................. | F17C 1/00 |
| | | | | 137/154 |

\* cited by examiner

*Primary Examiner* — Christopher P Ellis
(74) *Attorney, Agent, or Firm* — Pearne & Gordon LLP

(57) ABSTRACT

The present invention ensures explosion-proof performance without increasing the capacity for supplying nitrogen-enriched air in an aircraft fuel system having a ventilation function. An aircraft fuel system includes: fuel tanks; an NEA supply system; a left ventilation channel extending from a ventilation duct to a fuselage and leading into the tanks; and a right ventilation channel extending from a ventilation duct to the fuselage and leading into the tanks. The tank leading to the channel and the tank leading to the channel are separated by a central wall. The tanks communicate with each other through a fuel path, which allows, of fuel and gas, only the fuel to pass through, and float valves.

9 Claims, 7 Drawing Sheets

AIRCRAFT FUEL SYSTEM AND AIRCRAFT

BACKGROUND OF THE INVENTION

1. Field of the Invention

The present invention relates to an aircraft fuel system equipped with a fuel tank to which nitrogen-enriched air richer in nitrogen than the air is supplied.

2. Description of the Related Art

In a flying aircraft, as the fuel tank is filled with vaporized fuel, it is necessary to prevent the fuel tank from exploding in events such as lightning strikes on the tank or wiring short-circuit. In this connection, an explosion-proof system has been proposed (U.S. Pat. No. 6,547,188). This system supplies the fuel tank with nitrogen-enriched air (hereinafter, NEA), which is higher in nitrogen concentration and lower in oxygen concentration than the air, with bleed air from the engine serving as a gas source.

The outside air pressure changes during ascent and descent of an aircraft. During that time, it is necessary to avoid the fuel tank being subjected to an excessive pressure due to the differential pressure between the outside air pressure and the internal pressure of the fuel tank. It is also necessary to take the air into the fuel tank in an amount corresponding to the volume of the fuel consumed during the flight. For this purpose, the fuel tank has a ventilation function which achieves a balance between the outside air pressure and the tank internal pressure by means of a ventilation channel leading to the outside air.

As the ventilation channel, a left ventilation channel extending in the length direction of the left main wing and a right ventilation channel extending in the length direction of the right main wing are provided. These left ventilation channel and right ventilation channel are each provided with a ventilation port which leads into the fuel tanks in the respective channels.

Here, both the left ventilation channel and the right ventilation channel communicate with the inside of an inner tank located in the fuselage. This arrangement can develop a cross-flow phenomenon of the air blowing through from the left ventilation channel to the right ventilation channel, or from the right ventilation channel to the left ventilation channel.

As the air in cross-flow is supplied into the fuel tank, the NEA supplied in the fuel tank decreases in nitrogen concentration and increases in oxygen concentration.

Increasing the NEA supply capacity to avoid this situation requires a larger amount of bleed air, which increases the amount of air taken into the engine and degrades the fuel efficiency.

Based on the above-described problem, the object of the present invention is to ensure explosion-proof performance without increasing the NEA supply capacity in an aircraft fuel system having a ventilation function.

SUMMARY OF THE INVENTION

An aircraft fuel system of the present invention includes: multiple fuel tanks for storing fuel; a nitrogen-enriched air supply system which supplies nitrogen-enriched air into at least one of the fuel tanks; a left ventilation channel extending from a ventilation duct, which is provided in a left main wing and leads to the outside air, to a fuselage and leads into the fuel tanks located in the left ventilation channel; and a right ventilation channel extending from a ventilation duct, which is provided in a right main wing and leads to the outside air, to the fuselage and leads into the fuel tanks located in the right ventilation channel.

The fuel tank which is at least partially located in the fuselage and leads to the left ventilation channel and the fuel tank which is at least partially located in the fuselage and leads to the right ventilation channel are separated by a shutoff wall for shutting off gas, and the fuel tanks separated by the shutoff wall communicate with each other through a fuel passage part which allows, of the fuel and the gas, only the fuel to pass through.

Here, examples of the form of the fuel tanks include a casing having independent walls, and a vessel-like tank, other than the inside of a wing box compartmented by partition walls.

The form of the shutoff wall can be arbitrarily determined according to the form of the fuel tanks. For example, when the fuel tank is formed into a casing, the shutoff wall can be constituted of the walls facing each other of the fuel tanks adjacent to each other side by side.

In the present invention, the left and right fuel tanks which are at least partially located in the fuselage are separated by the shutoff wall, so that both of the outside air inflowing through the ventilation duct of the left ventilation channel and the outside air inflowing through the ventilation duct of the right ventilation channel are shut off by the shutoff wall. Thus, the cross-flow of the air blowing through from the left to the right or from the right to the left can be blocked.

According to the present invention, since the outside air does not blow into the fuel tanks, decrease in nitrogen concentration of the gas inside the fuel tank due to the oxygen contained in the outside air can be avoided. Therefore, the gas inside the fuel tank is maintained at a nitrogen concentration sufficient to provide an adequate level of explosion-proof performance.

Thus, according to the present invention, as it is not necessary to increase the NEA supply capacity, it is possible to ensure explosion-proof performance while avoiding degradation of fuel efficiency incurred when the NEA supply capacity is increased.

While preventing blow-through of the outside air by means of the shutoff wall as described above, the present invention can provide the fuel supply system with redundancy by securing a back-and-forth fuel flow between the left and right fuel tanks located in the fuselage.

Supposing that there is no fuel passage part, the left and right fuel tanks located in the fuselage would have fuel storage spaces independent of each other with the shutoff wall as the boundary. Then, a first fuel supply system which delivers the fuel inside the left fuel tank and a second fuel supply system which delivers the fuel inside the right fuel tank are configured independently of each other. In this case, the fuel inside the fuel tank connected to a failed fuel supply system becomes unavailable.

In the present invention, by contrast, the provision of the fuel passage part makes it possible to shut off the gas while allowing only the fuel to flow back and forth between the fuel tanks on both sides of the shutoff wall.

Through the fuel passage part, the left and right fuel tanks located in the fuselage can be regarded as the same storage space. Since the fuel can be taken out from this storage space by both of the first fuel supply system and the second fuel supply system, even in the event of failure in one of the systems, the fuel inside the storage space formed of the left and right fuel tanks can be continuously used by the other system.

Moreover, even when a difference occurs in the amount of fuel consumption between the fuel tanks separated by the shutoff wall due to malfunction of one of the left and right engines etc., the fuel moves through the fuel passage part, thereby achieving a balance in the fuel amount inside the fuel tanks. Thus, it is possible to avoid a lateral shift of the center of gravity of the airframe due to an imbalance in the fuel amount.

In addition, since the two fuel tanks communicating with each other through the fuel passage part can be regarded as one fuel tank, it is not necessary to separately display the amount of fuel in the fuel tanks, so that the display area of the cockpit can be used effectively.

The fuel passage part in the present invention may include: a fuel path passing through the shutoff wall; and float valves provided on the left and right sides across the shutoff wall, wherein it is preferable that each of the float valves opens the fuel path when the fuel level rises.

As will be described later in detail with reference to the drawings, providing the float valve on both sides of the shutoff wall allow the fuel inside the left and right fuel tanks separated by the shutoff wall to flow back and forth as necessary through the same fuel path.

In the present invention, a rib provided in a wing box of the main wing may be used for the shutoff wall.

In the present invention, the shutoff wall may include a plurality of fuel passage parts.

The aircraft fuel system according to the present invention may further include a display that displays a unified fuel amount in the fuel tanks separated by the shutoff wall.

In the present invention, the fuel passage part may include: a fuel path passing through the shutoff wall; and an assembly provided on the left and right sides across the shutoff wall and comprising a spring that presses a valve body, wherein it is preferable that a force with which the spring presses the valve body is smaller than a force with which the fuel presses the valve body, and larger than a force with which an air flow of a cross-flow presses the valve body.

In the present invention, the fuel passage part may include: a fuel path comprising a pipe passing through the shutoff wall; and float valves provided on both ends of the pipe across the shutoff wall, and it is preferable that each of the float valves opens the fuel path when the fuel level rises.

The fuel path may be located on the lower side in the fuel tanks separated by the shutoff wall when an aircraft is in an attitude which the aircraft normally takes during a flight.

An aircraft of the present invention includes the above-described fuel system.

According to the present invention, it is possible to ensure explosion-proof performance without increasing the NEA supply capacity in an aircraft fuel system having a ventilation function.

DETAILED DESCRIPTION OF THE PREFERRED EMBODIMENTS

In the following, embodiments of the present invention will be described with reference to the accompanying drawings.

Figure 1:
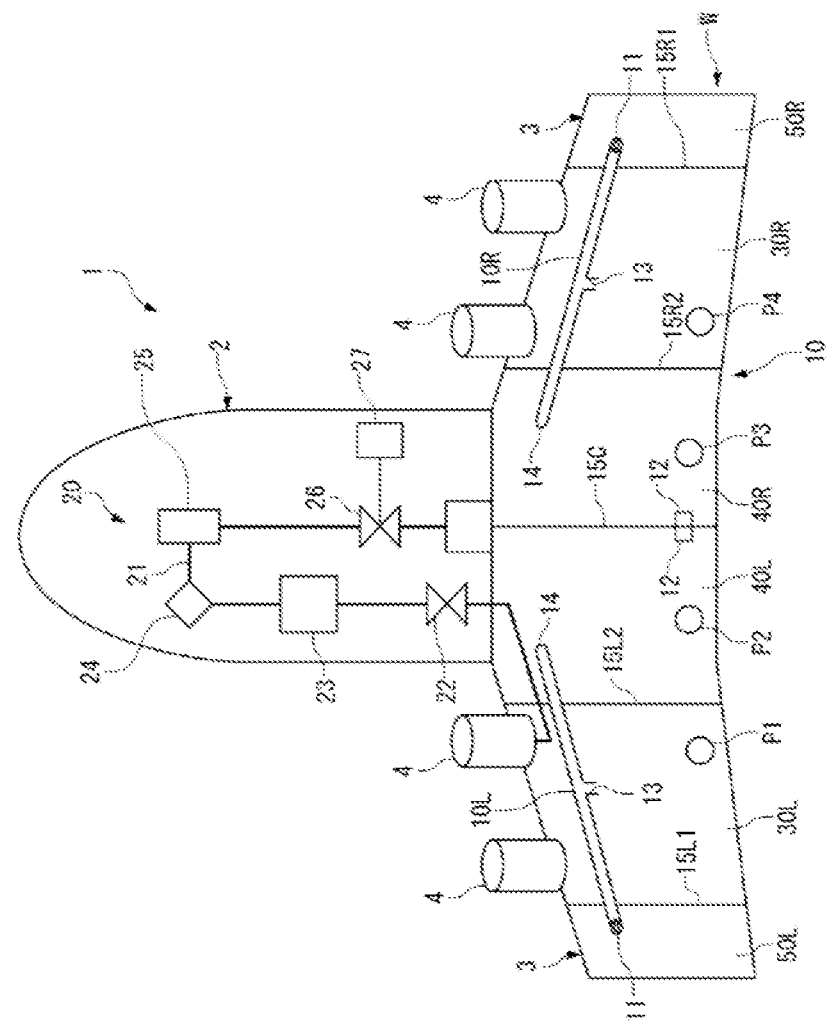
FIG. 1 is a schematic view showing an aircraft which is an embodiment of the present invention, with a fuselage on the rear side from main wings omitted.

A fuel system 10 having multiple fuel tanks is installed in an aircraft 1 shown in FIG. 1. For preventing explosion, the fuel system 10 has an NEA supply system 20 which supplies the fuel tanks with nitrogen-enriched air (NEA) which is richer in nitrogen relative to the air.

First, the basic structure of the aircraft 1 will be described.

The aircraft 1 includes a fuselage 2, and a pair of main wings 3 and 3 extending to the left and the right from the fuselage 2.

The main wing 3 includes spars, skins, stringers, and ribs. These spars, skins, stringers, and ribs are assembled to form a wing box W. The wing box W extends along almost the entire main wings 3 and 3 in their length direction and across the fuselage 2.

Figure 2:
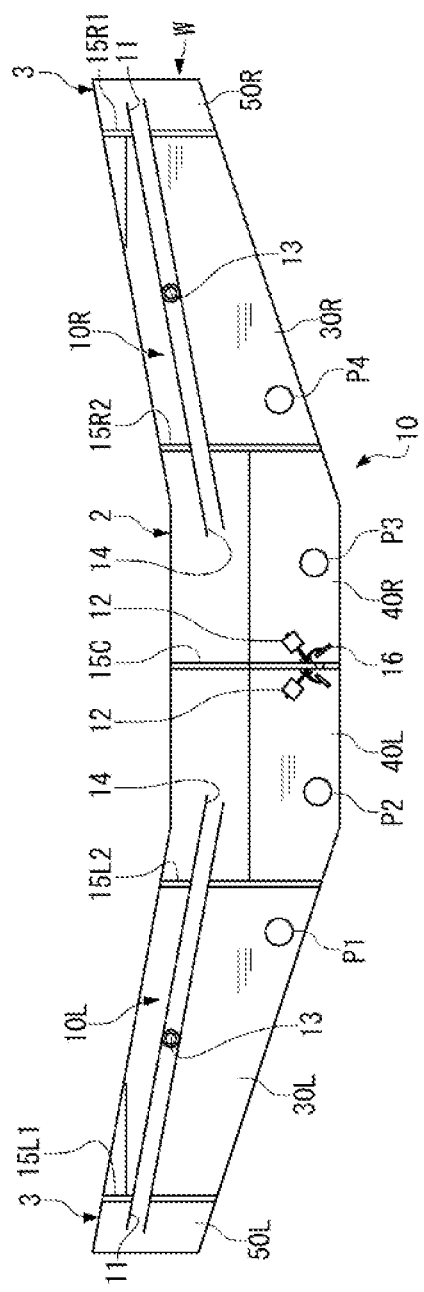
FIG. 2 is a cross-sectional view of a fuel system schematically depicted from the front side of an airframe.

Next, the configuration of the fuel system 10 will be described with reference to FIG. 1 and FIG. 2.

The fuel system 10 includes outer tanks 30L and 30R and inner tanks 40L and 40R as fuel tanks which are formed by compartmenting the inside of the wing box W, and a left ventilation channel 10L and a right ventilation channel 10R for achieving a balance between the outside air pressure and the tank internal pressure.

The outer tank 30L is located in the left main wing 3, while the outer tank 30R is located in the right main wing 3.

The inner tank 40L is located in the left half of the fuselage 2, while the inner tank 40R is located in the right half of the fuselage 2.

Although the inner tanks 40L and 40R are provided from the fuselage 2 to the roots of the main wings 3, these tanks may be provided only within the fuselage 2.

The outer tanks 30L and 30R and the inner tanks 40L and 40R are provided with fuel supply pumps P1 to P4, respectively, which pump the fuel toward engines 4. The fuel supply pumps P1 to P4 are connected through a pipe to a fuel outlet of the tanks 30L, 30R, 40L, and 40R, respectively. It is preferable that the fuel outlet is located at a position on the lower side in the tank when the aircraft 1 is in an attitude which it can normally take during a flight.

In addition to the fuel tanks, surge tanks 50L and 50R are provided inside the wing box W.

The surge tank 50L is provided at the wing tip of the left main wing 3, while the surge tank 50R is provided at the wing tip of the right main wing 3. The surge tank 50L is provided to hold the fuel transiently entering the left ventilation channel 10L from the outer tank 30L or the inner tank 40L, and prevent the fuel from immediately leaking to the outside of the airframe. The surge tank 50R functions in the same manner for the outer tank 30R, the inner tank 40R, and the right ventilation channel 10R.

Partition walls (partition walls 15L1, 15L2, 15C, 15R2, and 15R1) are provided respectively between adjacent two of the tanks 50L, 30L, 40L, 40R, 30R, and 50R equipped in the fuel system 10. These partition walls are formed incorporating ribs existing inside the wing box W.

The partition wall 15L1 is located between the surge tank 50L and the outer tank 30L, and the partition wall 15L2 is located between the outer tank 30L and the inner tank 40L. The storage space of the outer tank 30L is compartmented by these partition walls 15L1 and 15L2.

The partition wall 15R1 is located between the surge tank 50R and the outer tank 30R, and the partition wall 15R2 is located between the outer tank 30R and the inner tank 40R. The storage space of the outer tank 30R is compartmented by these partition walls 15R1 and 15R2.

The inner tank 40R and the inner tank 40L are separated by the partition wall 15C (hereinafter, the central wall 15C) serving as the shutoff wall for shutting off the gas.

The central wall 15C is located on the center line running through the fuselage 2 of the aircraft 1 in the front-rear direction.

Figure 3A:
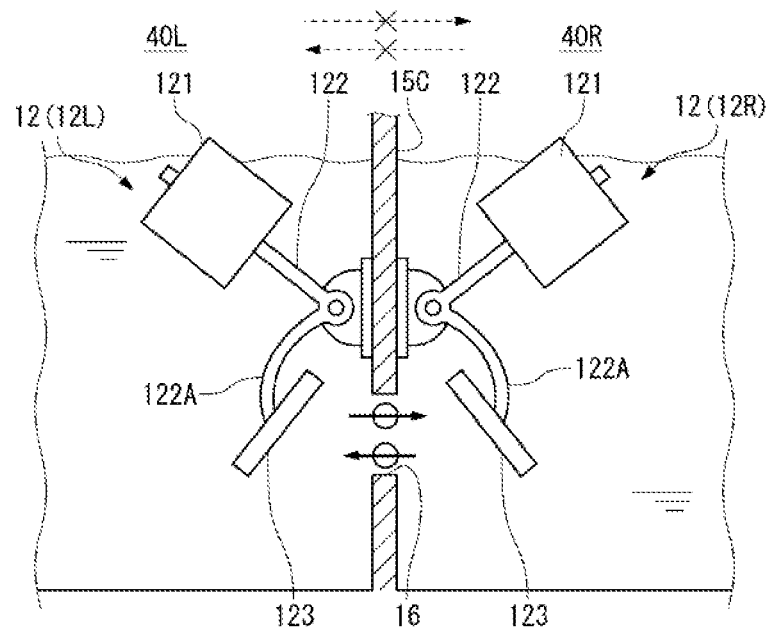
FIGS. 3A and 3B are views showing float valves provided on a shutoff wall.
Figure 3B:
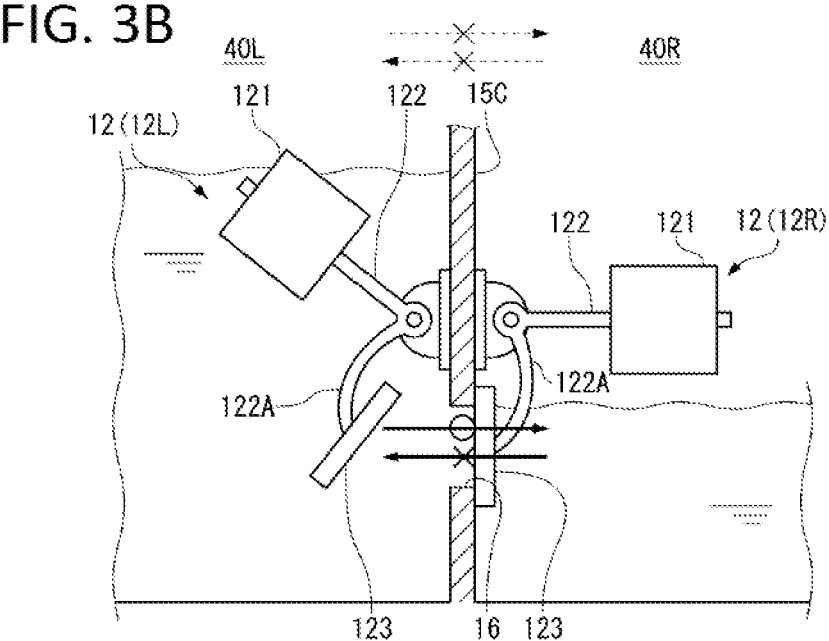

As shown in FIG. 3A and FIG. 3B, the central wall 15C is provided with a fuel path 16 passing through the central wall 15C in the thickness direction, and float valves 12 and 12 for opening and closing the fuel path 16.

It is preferable that the fuel path 16 is located on the lower side in the inner tanks 40L and 40R when the aircraft 1 is in an attitude which it can normally take during a flight.

The float valves 12 are provided on the left and right sides across the central wall 15C.

The fuel path 16 and the float valves 12 and 12 constitute a fuel passage part which, as will be described below, allows, of the gas and the fuel, only the fuel to pass through.

The float valve 12 includes: a float 121 floating on the fuel; a lever 122 which is rotated by buoyancy of the float 121; and a valve body 123 fixed by an arm 122A extending from the lever 122.

The float 121 moves up and down according to the fuel level inside the tank.

The lever 122 is provided on the central wall 15C above the fuel path 16 such that it can turn, and interlocked with the motion of the float 121.

The valve body 123 closes or opens the fuel path 16 through the lever 122 being turned.

Contrary to the typical float valve used for a fuel supply system of an engine, this float valve 12 opens when the fuel level rises and closes when the fuel level falls.

Figure 4:
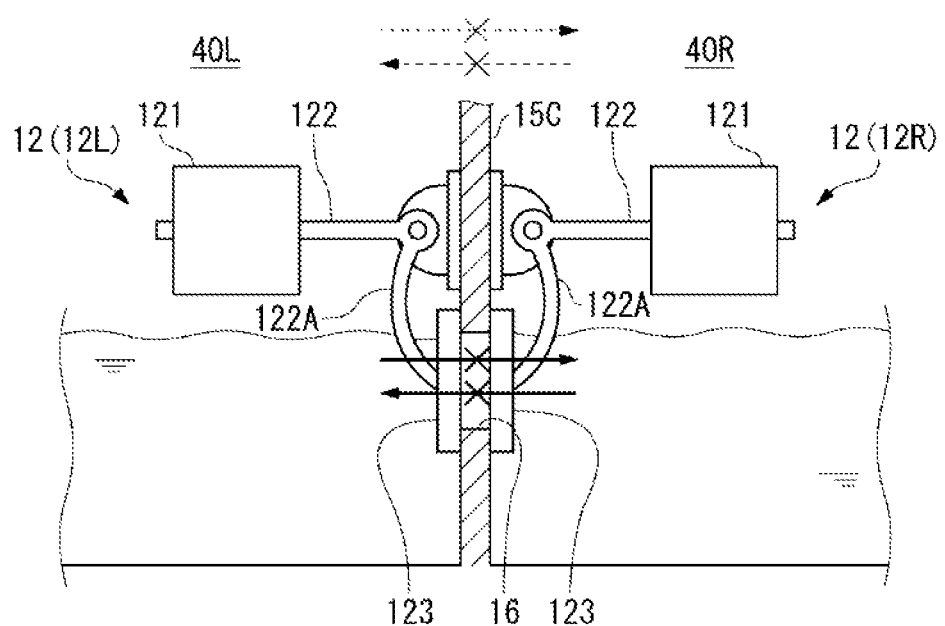
FIG. 4 is a view showing the float valves provided on the shutoff wall.

In FIG. 3A, FIG. 3B, and FIG. 4, the direction of the fuel flow is indicated by the solid arrows, and the arrow is circled when the flow in that direction is allowed, while the arrow is crossed out when not allowed. The direction of the gas flow is indicated by the dashed arrows, and the arrows are circled or crossed out in the same manner.

As shown in FIG. 3A, when a predetermined amount or a larger amount of the fuel is stored in each of the inner tank 40L and the inner tank 40R, the float valves 12 on the left and right sides are open. In this case, the fuel can flow through the fuel path 16 from the inner tank 40L to the inner tank 40R, or from the inner tank 40R to the inner tank 40L. Thus, the inside of the inner tank 40L and the inside of the inner tank 40R are formed as one continuous storage space.

FIG. 3A shows an example where the fuel levels in the inner tank 40L and the inner tank 40R are equal. When there is a change in the attitude of the airframe or when there is a difference in the pumping amount of the fuel supply pumps P2 and P3, a difference occurs between the fuel levels in these tanks 40L and 40R as shown in FIG. 3B. In this case, the opening degrees of the float valves 12 and 12 are different from each other.

As shown in FIG. 3B, when the float valve 12L located on the left side is open, and the float valve 12R located on the right side is closed, the valve body 123 of the right float valve 12R is pushed open by the pressure of the fuel inside the inner tank 40L where the fuel level is higher. This causes the fuel inside the inner tank 40L to be transferred into the inner tank 40R.

As the valve body 123 of the right float valve 12R is closed, the fuel is not transferred from the right to the left.

When the fuel is transferred from the inner tank 40L to the inner tank 40R, the fuel levels in the tanks 40L and 40R become equal as shown in FIG. 3A.

As the amount of fuel stored in the inner tank 40L and the inner tank 40R decreases, the opening degrees of the float valves 12 and 12 become gradually smaller. Then, as shown in FIG. 4, when the amount of fuel in the inner tank 40L and the inner tank 40R has become small, the float valves 12 and 12 are closed. In this case, the fuel is separately stored in the inner tank 40L and the inner tank 40R.

Next, the configurations of the left ventilation channel 10L extending in the length direction of the left main wing 3 and the right ventilation channel 10R extending in the length direction of the right main wing 3 will be described with reference to FIG. 2.

Ventilation through the left ventilation channel 10L and the right ventilation channel 10R prevents the tank from being subjected to an excessive pressure due to the differential pressure between the tank internal pressure and the outside air pressure. In addition, these channels prevent generation of negative pressure inside the tank and maintain a fuel supply by introducing the outside air into the tank in an amount corresponding to the amount of fuel consumption inside the tank.

The left ventilation channel 10L and the right ventilation channel 10R are formed independently of each other on the left and right sides across the central wall 15C.

The left ventilation channel 10L passes through the partition wall 15L1 and the partition wall 15L2 from the surge tank 50L along the length direction of the main wing 3 and communicates with the inside of the inner tank 40L.

The left ventilation channel 10L includes: a ventilation duct 11 provided in the surge tank 50L and leading to the outside air; a ventilation port 13 leading into the outer tank 30L; and a ventilation port 14 leading into the inner tank 40L.

The right ventilation channel 10R passes through the partition wall 15R2 and the partition wall 15R1 from the surge tank 50R along the length direction of the main wing 3 and communicates with the inside of the inner tank 40R.

As with the left ventilation channel 10L, the right ventilation channel 10R includes: a ventilation duct 11 provided in the surge tank 50R and leading to the outside air; a ventilation port 13 leading to the inside of the outer tank 30R; and a ventilation port 14 leading to the inside of the inner tank 40R.

It is preferable that the ventilation ports 13 and 14 provided respectively in the left ventilation channel 10L and the right ventilation channel 10R are located at positions where the fuel inside the tank is unlikely to enter the port, in order to ensure the ventilation function.

The left ventilation channel 10L and the right ventilation channel 10R of this embodiment are located on the upper side in the tank during ascent of the airframe when the nose of the aircraft 1 is lifted, and during a cruise when the fuselage 2 is nearly level. Thus, since the ventilation ports 13 and 14 are located above the fuel levels inside the tanks, the fuel is unlikely to enter the ventilation channels 10L and 10R through the ventilation ports 13 and 14.

Although during descent of the airframe the positions of the left ventilation channel 10L and the right ventilation channel 10R are lowered from the positions during ascent and a cruise, the positions of the ventilation ports 13 and 14 are located above the fuel levels because the amount of the fuel stored in the tank has become small due to fuel consumption during the flight up to that point. Thus, the fuel is unlikely to enter the ventilation channels 10L and 10R through the ventilation ports 13 and 14 all the same.

As described above, the left ventilation channel 10L communicates with the inside of the inner tank 40L, while the right ventilation channel 10R communicates with the inside of the inner tank 40R.

Here, the central wall 15C exists between the inner tank 40L and the inner tank 40R. This central wall 15C shuts off gas passage from the inside of the inner tank 40L to the inside of the inner tank 40R, or vice versa.

On top of that, the central wall 15C is provided with the fuel path 16, and this fuel path 16 allows fuel passage from the inside of the inner tank 40L to the inside of the inner tank 40R, or vice versa.

The fuel path 16 and the float valves 12 are located on the central wall 15C.

When the float valves 12 and 12 are open (FIG. 2 and FIG. 3A), since the fuel path 16 is filled with the fuel stored in the inner tanks 40L and 40R, the gas inside the inner tank 40L and the gas inside the inner tank 40R cannot flow back and forth between the tanks through the fuel path 16.

Further, when the float valves 12 and 12 are closed (FIG. 4), since the fuel path 16 is blocked by the valve bodies 123 of these valves, the gas inside the inner tank 40L and the gas inside the inner tank 40R cannot flow back and forth between the tanks through the fuel path 16 all the same.

For example, the gas flow from the inner tank 40L through the fuel path 16 toward the inner tank 40R is shut off by the float valve 12L located on the left side.

Contrarily, the gas flow from the inner tank 40R through the fuel path 16 toward the inner tank 40L is shut off by the float valve 12R located on the right side.

When the left float valve 12L is open and the right float valve 12 is closed (FIG. 3B), as the fuel path 16 is filled with the fuel stored in the inner tank 40L, the gas flow from the left toward the right is shut off. In addition, since the fuel path 16 is blocked by the valve body 123 of the right float valve 12R, the gas flow from the right toward the left is also shut off.

Thus, regardless of the amount of fuel stored in the inner tanks 40L and 40R or the fuel levels in the tanks 40L and 40R, gas passage through the fuel path 16 is always shut off. Accordingly, the left ventilation channel 10L and the right ventilation channel 10R are configured as ventilation systems independent of each other with the central wall 15C as the boundary.

Figure 5:
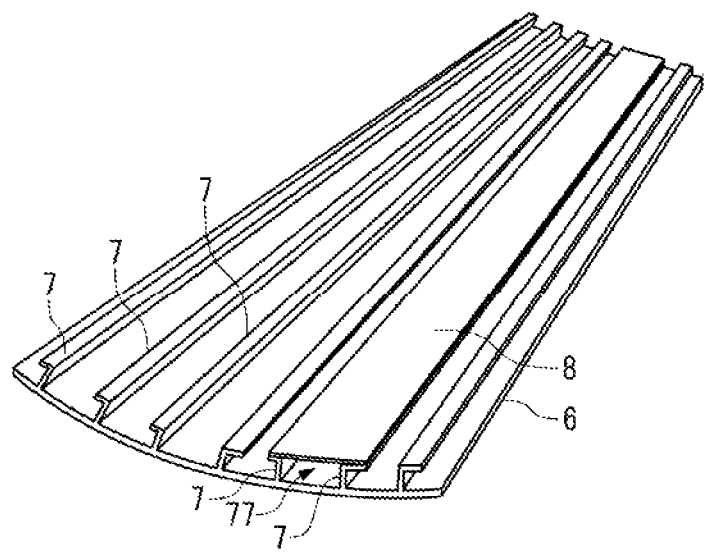
FIG. 5 is a view showing a ventilation channel using stringers.

The left ventilation channel 10L and the right ventilation channel 10R can be configured with normal pipes, and as shown in FIG. 5, can be configured with stringers 7 as well.

When the stringers 7 are used, the space between the adjacent stringers 7 and 7 is covered with a cover member 8, and the space between the cover member 8 and the ribs (not shown) is sealed with a plate member or a sealant as necessary. In this way, a passage 77 formed inside the skin 6, the adjacent stringers 7 and 7, and the cover member 8 is used as the left ventilation channel 10L and the right ventilation channel 10R.

Next, the NEA supply system 20 will be described with reference to FIG. 1.

The NEA supply system 20 supplies NEA into the fuel tank to thereby prevent fuel explosion. All of the fuel tanks, some of the fuel tanks or one of the fuel tanks can be selected as the NEA supply destination. In this embodiment, the inner tanks 40L and 40R are selected as the destinations.

The NEA supply system 20 includes a gas pipe 21 for guiding the bleed air from the engines 4 into the inner tanks 40L and 40R, and on this gas pipe 21, an on-off valve 22, a temperature regulation mechanism 23, a filter 24, an air separation module (ASM) 25, and a flow control valve (FCV) 26 are disposed in this order.

For the convenience of illustration, the NEA supply system 20 is shown in the front half of the fuselage 2; however, the NEA supply system 20 can be installed in a part inside the wing box W corresponding to the fuselage 2.

Part of the air compressed inside the engines 4, which generates thrust force for the aircraft 1, is taken out as bleed air and guided through the gas pipe 21 to the on-off valve 22. Subsequently, the temperature of the bleed air is regulated in the temperature regulation mechanism 23, and after passing through the filter 24, the bleed air is guided to the ASM 25.

The temperature regulation mechanism 23 cools the bleed air from the engines 4 in order to efficiently operate the ASM 25. A heat exchanger can be used as the temperature regulation mechanism 23. In this case, the outside air, or cold air obtained by air conditioners equipped in the aircraft 1 can be used as the cooling medium.

The filter 24 removes pollutants contained in the bleed air in order to maintain the oxygen separation performance of the ASM 25.

The ASM 25 is mainly composed of a hollow fiber polymer membrane. Taking advantage of the characteristic of oxygen gas that it is several times more likely to permeate a hollow fiber wall than nitrogen gas, the ASM 25 separates oxygen from the bleed air to obtain NEA.

The ASM 25 can be arbitrarily configured, and modules that are mainly composed of an oxygen adsorption polymer membrane can be used.

The NEA obtained by the ASM 25 passes through the FCV 26 and is supplied into the inner tanks 40L and 40R to which the gas pipe 21 leads. Opening and closing of the FCV 26 is controlled by a control part 27.

The fuel system 10 having the configuration as described above is characterized in that the left ventilation channel 10L and the right ventilation channel 10R for ventilation are independent of each other with the central wall 15C as the boundary.

Supposing that there is no central wall 15C between the inner tanks 40L and 40R, the left ventilation channel 10L and the right ventilation channel 10R would communicate with the same continuous space formed by the inner tanks 40L and 40R. Accordingly, a continuous ventilation system from the left ventilation channel 10L to the right ventilation channel 10R is formed. This can cause the cross-flow phenomenon of the outside air taken in through the ventilation duct 11 of the left ventilation channel 10L blowing through to the ventilation duct 11 of the right ventilation channel 10R, or vice versa, for example, when the aircraft is traveling with its airframe deflected from the airflow direction instead of in an attitude along the airflow, when ice or foreign matters are attached to the ventilation port, or when the aircraft receives crosswind while parked on the ground etc.

Once the air in this cross-flow blows into the inner tanks 40L and 40R, the oxygen contained in the air causes a reduction in nitrogen concentration and an increase in oxygen concentration of the gas inside the inner tanks 40L and 40R.

To prevent this, the central wall 15C is provided between the inner tanks 40L and 40R in this embodiment so as to shut off the gas flow from the tank 40L to the tank 40R, or from the tank 40R to the tank 40L. In this way, the cross-flow can be blocked, so that the gas inside the inner tanks 40L and 40R is kept at a nitrogen concentration sufficient to inactivate the gas against phenomena such as sparking which can lead to explosion.

The air in cross-flow also flows into the outer tanks 30L and 30R which are fuel tanks other than the inner tanks 40L and 40R. Thus, also when the NEA is supplied into the outer tanks 30L and 30R, it is significant that the cross-flow is blocked by the central wall 15C, which allows the gas inside the outer tanks 30L and 30R to be kept at a predetermined nitrogen concentration.

In this way, according to this embodiment, as it is not necessary to increase the NEA supply capacity of the NEA supply system 20 in order to maintain the explosion-proof performance, it is possible to ensure the explosion-proof performance while avoiding degradation of fuel efficiency incurred when the NEA supply capacity is increased.

Here, since the ribs which are originally provided in the wing box W are used for the central wall 15C of this embodiment, weight increase and cost increase due to installation of the central wall 15C can be minimized. In addition, since the existing ribs are used, the installation space is not constricted. This advantage is particularly important for medium-sized and small-sized aircrafts whose installation space is significantly limited due to the smaller airframe compared with large-sized aircrafts.

In addition, in this embodiment, the provision of the fuel path 16 and the float valves 12 and 12 on the central wall 15C gives redundancy to the fuel supply system. This will be described in the following.

The fuel inside the inner tank 40L is supplied toward the engine 4 by the fuel supply pump P2, while the fuel inside the inner tank 40R is supplied toward the engine 4 by the fuel supply pump P3.

Supposing that no fuel path 16 is provided, the inner tanks 40L and 40R would have fuel storage spaces independent of each other. Then, a first fuel supply system which pumps the fuel inside the inner tank 40L toward the engine by the fuel supply pump P2 and a second fuel supply system which pumps the fuel inside the inner tank 40R toward the engine by the fuel supply pump P3 are configured independently of each other.

In this case, in the event of malfunction of the fuel supply pumps P2 and P3 or clogging of the pipe, the fuel inside the tank which is connected with the fuel supply system including such a pump and a pipe becomes unavailable.

In this embodiment, therefore, providing the fuel path 16 and the float valves 12 and 12 in the central wall 15C makes it possible to shut off the gas while allowing only the fuel to flow back and forth between the inner tanks 40L and 40R. That is, when the fuel is sufficiently remaining inside the inner tanks 40L and 40R (FIG. 2, FIG. 3A), the fuel path 16 is filled with the fuel and the float valves 12 and 12 are open, so that it is possible to shut off gas passage through the fuel path 16 and at the same time to allow the fuel inside the inner tanks 40L and 40R to flow back and forth through the fuel path 16.

Through the fuel path 16, the inner tanks 40L and 40R can be regarded as one storage space, and the fuel inside this storage space is supplied to the engine 4 by the two fuel supply pumps P2 and P3.

Therefore, even when failure occurs in one of the first fuel supply system including the fuel supply pump P2 and the second fuel supply system including the fuel supply pump P3, the fuel inside the storage space formed of the inner tanks 40L and 40R can be continuously used by the other system. Thus, the redundancy is secured.

Here, the fuel path 16 and the float valves 12 and 12 may be provided at multiple positions of the central wall 15C. In this case, even when clogging of the fuel path 16 or malfunction of the float valves 12 and 12 occurs at one of the multiple positions, the fuel can flow back and forth between the inner tanks 40L and 40R through the fuel path 16 and the float valves 12 and 12 at other positions. Thus, the effect of the redundancy of the first and second fuel supply systems can be exerted.

Thereafter, as the fuel consumption inside the inner tanks 40L and 40R proceeds, the floats 121 of the float valves 12 and 12 move downward, causing the valve bodies 123 to close the fuel path 16. Thus, the first fuel supply system and the second fuel supply system become independent of each other. By the time the fuel path 16 provided on the lower side of the inner tanks 40L and 40R is closed, the amount of fuel remaining inside the inner tanks 40L and 40R has already become small. Therefore, it makes no difference even if the redundancy is lost by the fuel path 16 being closed.

The configuration of the fuel supply system can be determined according to the level of redundancy required for the fuel supply system. As long as the fuel supply system is connected to at least one of the inner tanks 40L and 40R, the fuel inside the tanks 40L and 40R can be taken out and supplied to the engine 4 through the fuel path 16.

Moreover, even when a difference occurs in the amount of fuel consumption between the inner tanks 40L and 40R due to malfunction of one of the engines 4 on the left and right sides, etc., the fuel moves through the fuel path 16, achieving a balance in the fuel amount between the inner tanks 40L and 40R. Thus, a lateral shift of the center of gravity of the airframe due to an imbalance in the fuel amount can be avoided.

Accordingly, it is not necessary to provide a fuel transfer system which prevents a lateral shift of the center of gravity of the airframe, or the operation of activating such a system is not required of the pilot.

Since the inner tanks 40L and 40R can be regarded as one tank as the storage spaces inside the inner tanks 40L and 40R are communicated through the fuel path 16, the displays for the fuel amount in each of the inner tanks 40L and 40R can be unified. That is, although there are four fuel tanks, two outer tanks 30L and 30R and two inner tanks 40L and 40R, it is only necessary to display three fuel amounts, namely, the fuel amount of the outer tank 30L, the total fuel amount of the inner tanks 40L and 40R, and the fuel amount of the outer tank 30R, which allows effective use of the display area of the display which is located inside the cockpit and of which the size is limited. In addition, the reduced amount of information to be displayed on the display can contribute to reduction of the workload of the pilot.

This embodiment realizes fuel transfer according to the fuel levels in the inner tanks 40L and 40R, which communicate with each other through the fuel path 16, with the simple mechanism using the float valves 12 and 12.

While providing a solenoid valve in the fuel path 16 and controlling opening and closing of the solenoid valve on the basis of the detected fuel level can also make the fuel flow back and forth according to the fuel levels of the inner tanks 40L and 40R, it is significant that, as in this embodiment, allowing only fuel passage is realized by means of the float valves 12 and 12 without involving electrical control. Due to its simple structure, the float valve 12 is less likely to malfunction, which can contribute to improvement of the reliability and can eliminate the risk of ignition of the fuel inside the tank due to malfunction of the electrical system.

Next, a modified example of the fuel passage part of the present invention will be shown.

Figure 6A:
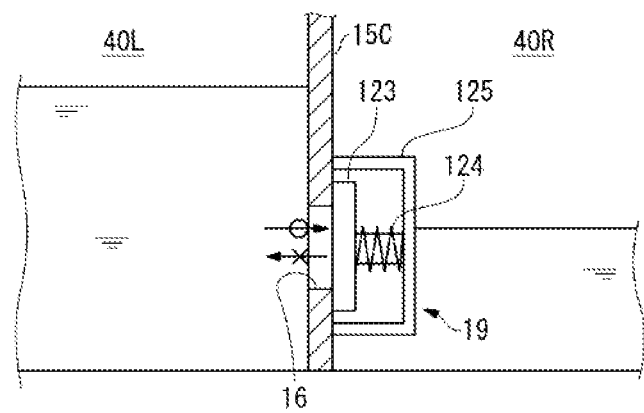
FIGS. 6A to 6C are views showing a modified example of the present invention.

In the example shown in FIG. 6A, the valve body 123 blocking the fuel path 16 is pressed by a spring 124. The valve 123 and the spring 124 are fitted to the case 125 to constitute an assembly 19. In this example, the fuel path 16 and the assembly 19 constitute the fuel passage part.

The force with which the spring 124 presses the valve body 123 is set to be smaller than the force with which the fuel presses the valve body 123 (fuel pressure), and larger than the force with which the air flow of the cross-flow presses the valve body 123.

Figure 6B:
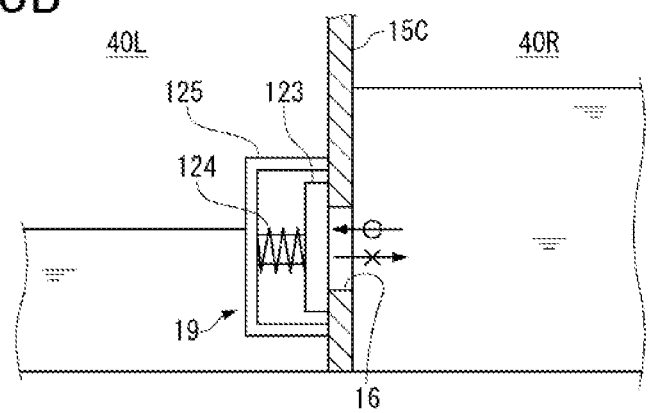
Figure 6C:
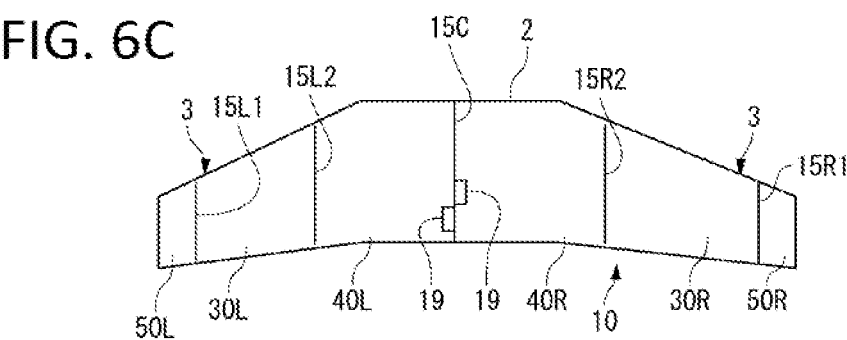

As shown in FIG. 6C, the assemblies 19 are provided on the right side and the left side of the central wall 15C with an offset between their positions on the central wall 15C. The central wall 15C is provided with two fuel passages for the right-side assembly 19 and the left-side assembly 19. It is preferable that the right-side assembly 19 and the left-side assembly 19 are disposed nearly at the same level.

As shown in FIG. 6A, when the fuel level inside the inner tank 40L is higher than the fuel level inside the inner tank 40R, the assembly 19 provided on the right side of the central wall 15C functions. The fuel inside the inner tank 40L pushes open the valve body 123 of the assembly 19, so that the fuel is transferred through an opening (not shown) of the case 125 to the inner tank 40R.

As shown in FIG. 6B, when the fuel level inside the inner tank 40R is higher than the fuel level inside the inner tank 40L, the assembly 19 provided on the left side of the central wall 15C functions. The fuel inside the inner tank 40R pushes open the valve body 123 of the assembly 19, so that the fuel is transferred through the opening of the case 125 to the inner tank 40L.

In this way, the fuel inside the inner tank 40L and the fuel inside the inner tank 40R can flow back and forth through the fuel path 16.

In the configuration shown in FIGS. 6A to 6C, too, the cross-flow is prevented. The air flow from the left ventilation channel 10L toward the right ventilation channel 10R is shut off without being able to push open either of the valve bodies 123 of the left and right assemblies 19 due to the pressing force of the spring 124 of each assembly 19 provided on the left and right sides of the central wall 15C. The air flow from the right ventilation channel 10R toward the left ventilation channel 10L is shut off in the same way.

Figure 7:
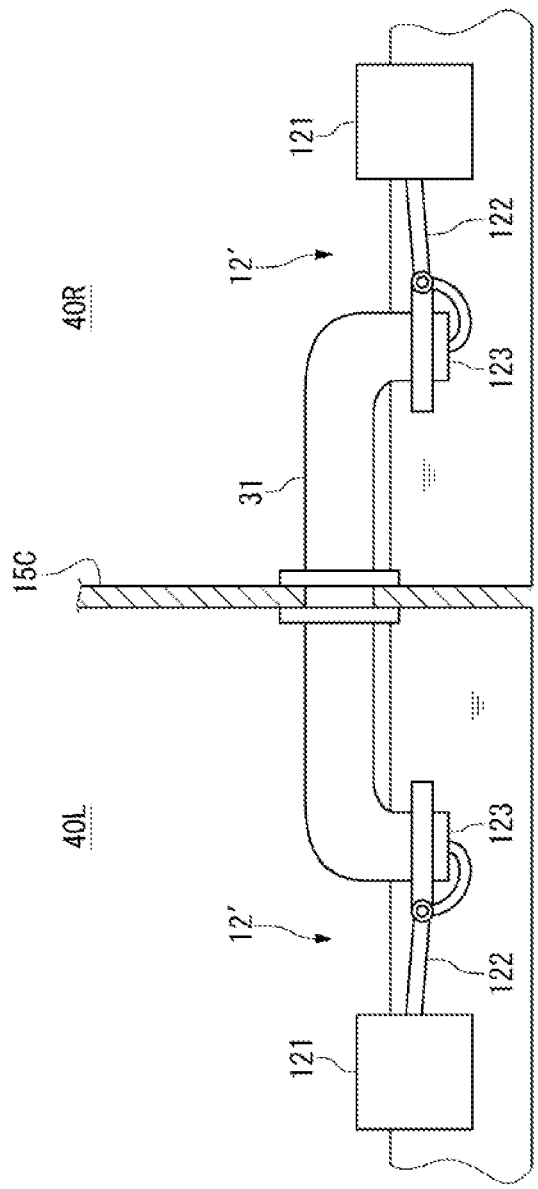
FIG. 7 is a view showing another modified example of the present invention.

Instead of the fuel path 16 and the float valves 12 of the above-described embodiment, a pipe 31 and float valves 12' shown in FIG. 7 can also constitute the fuel passage part.

The pipe 31 is passed through a hole penetrating the central wall 15C and forms a fuel path. The pipe 31 is bent at both ends toward the bottoms of the inner tanks 40L and 40R, respectively.

The float valve 12' is provided at one end of the pipe 31 located on the left side of the central wall 15C and at the other end of the pipe 31 located on the right side of the central wall 15C.

The valve body 123 of the float valve 12' opens and closes the opening at the end of the pipe 31.

The lever 122 of the float valve 12' is provided at the end of the pipe 31 so that it can turn.

The float 121 of the float valve 12' is separated from the valve body 123 in the direction almost along the valve body 123, and connected with the valve body 123 by the lever 122.

The float valve 12' is fitted so that the valve body 123 and the float 121 are in a linear positional relation with each other.

The float valve 12' opens when the fuel level rises and closes when the fuel level falls as with the above-described float valve 12.

In the configuration shown in FIG. 7, the valve body 123 and the float 121 can be disposed in a linear positional relation by opening and closing the fuel path formed of the pipe 31, whose both ends are bent toward the tank bottoms, by the float valve 12' from the side of the tank bottoms. Therefore, fitting of the parts of the float valve 12' and fitting of the float valve 12' to the pipe 31 are facilitated, and maintenance including replacement of the float valve 12' is also facilitated, and besides, freedom in selecting the float valve 12' is improved.

Moreover, the fuel passage part of the present invention can also be constituted of, for example, a filter which selectively transmits only the fuel out of the fuel and the gas, and the fuel path 16 of the central wall 15C.

Other than the above examples, the configurations introduced in the above embodiments can be selected or changed into another configuration, as long as such a change does not depart from the scope of the present invention.

The fuel tank in the fuel system 10 can be arbitrarily configured. For example, the outer tanks 30L and 30R may be each divided into multiple tanks. As long as one fuel tank located in the channel of the left ventilation channel 10L and another fuel tank located in the channel of the right ventilation channel 10R are provided, the inside of the wing box W can be arbitrarily compartmented.

While it is preferable that the central wall 15C is provided along the center line running through the fuselage 2 in the front-rear direction, the central wall 15C can be provided at an arbitrary position between the ventilation port 14 of the left ventilation channel 10L and the ventilation port 14 of the right ventilation channel 10R.

In addition, in the above-described embodiment, the surge tanks 50L and 50R are provided with the ventilation ducts 11 and 11; however, these ventilation ducts 11 and 11 can be instead provided in the outer tanks 30L and 30R.

Moreover, it is not absolutely necessary to provide the fuel supply pumps P1 to P4 corresponding to the tanks 30L, 40L, 40R, and 30R, respectively, as in the above-described embodiment.

For example, it is possible to provide a pump for transferring the fuel from the inner tank 40L to the outer tank 30L and a pump for transferring the fuel from the inner tank 40R to the outer tank 30R, to thereby omit the fuel supply pumps P2 and P3 corresponding to the inner tanks 40L and 40R, while retaining only the fuel supply pumps P1 and P4 corresponding to the outer tanks 30L and 30R to which the fuel is transferred. In this case, the fuel inside the inner tank 40L is used through the outer tank 30L, and the fuel inside the inner tank 40R is used through the outer tank 30R. In this case, too, the effect of the redundancy realized by allowing the fuel inside the inner tank 40L and 40R to flow back and forth through the fuel passage part can be exerted.

What is claimed is:

1. An aircraft fuel system, comprising:
   multiple fuel tanks for storing fuel;
   a nitrogen-enriched air supply system which supplies nitrogen-enriched air into at least one of the multiple fuel tanks;
   a left ventilation channel extending from a ventilation duct, which is provided in a left main wing and leads to the outside air, to a fuselage and leads into the fuel tanks located in the left ventilation channel; and
   a right ventilation channel extending from a ventilation duct, which is provided in a right main wing and leads to the outside air, to the fuselage and leads into the fuel tanks located in the right ventilation channel, wherein
   the fuel tank which is at least partially located in the fuselage and leads to the left ventilation channel and the fuel tank which is at least partially located in the fuselage and leads to the right ventilation channel are separated by a shutoff wall for shutting off gas, and the fuel tanks separated by the shutoff wall communicate with each other through a fuel passage part which allows, of the fuel and the gas, only the fuel to pass through.

2. The aircraft fuel system according to claim 1, wherein the fuel passage part comprises: a fuel path passing through the shutoff wall; and float valves provided on both sides across the shutoff wall, and each of the float valves opens the fuel path when the fuel level rises.

3. The aircraft fuel system according to claim 1, wherein a rib provided in a wing box of the main wing is used for the shutoff wall.

4. The aircraft fuel system according to claim 1, wherein the shutoff wall comprises a plurality of fuel passage parts.

5. The aircraft fuel system according to claim 1, further comprising a display that displays a unified fuel amount in the fuel tanks separated by the shutoff wall.

6. The aircraft fuel system according to claim 1, wherein the fuel passage part comprises: a fuel path passing through the shutoff wall; and an assembly provided on both sides across the shutoff wall and comprising a spring that presses a valve body, wherein a force with which the spring presses the valve body is smaller than a force with which the fuel presses the valve body, and larger than a force with which an air flow of a cross-flow presses the valve body.

7. The aircraft fuel system according to claim 1, wherein the fuel passage part comprises: a fuel path comprising a pipe passing through the shutoff wall; and float valves provided on both ends of the pipe across the shutoff wall, and each of the float valves opens the fuel path when the fuel level rises.

8. The aircraft fuel system according to claim 2, wherein the fuel path is located on the lower side in the fuel tanks separated by the shutoff wall when an aircraft is in an attitude which the aircraft normally takes during a flight.

9. An aircraft comprising the aircraft fuel system according to claim 1.

* * * * *